United States Patent [19]
Cho

[11] Patent Number: 5,962,773
[45] Date of Patent: Oct. 5, 1999

[54] APPARATUS FOR MEASURING INTENSITY OF ULTRASONIC WAVES IN A CLEANING TANK

[75] Inventor: Sheung-ihn Cho, Suwon, Rep. of Korea

[73] Assignee: Samsung Display Devices Co., Ltd., Kyungki-do, Rep. of Korea

[21] Appl. No.: 08/893,179

[22] Filed: Jul. 15, 1997

[30] Foreign Application Priority Data

Dec. 5, 1996 [KR] Rep. of Korea ..................... 96-62125

[51] Int. Cl.$^6$ .................................................. G01D 18/00
[52] U.S. Cl. ............................................. 73/1.86; 73/649
[58] Field of Search .................................... 73/1.82, 1.83, 73/1.86, 649; 367/13; 181/139; 381/58

[56] References Cited

U.S. PATENT DOCUMENTS

| | | | |
|---|---|---|---|
| 4,453,408 | 6/1984 | Clayman | 73/1.86 |
| 4,903,523 | 2/1990 | Flynn | 73/1.86 |
| 5,433,102 | 7/1995 | Pedziwiatr | 73/1.83 |
| 5,440,914 | 8/1995 | Tachibana | 73/1.85 |
| 5,660,909 | 8/1997 | Tachibana | 73/649 |

*Primary Examiner*—Christine K. Oda
*Attorney, Agent, or Firm*—Lowe Hauptman Gopstein Gilman & Berner

[57] ABSTRACT

An apparatus for measuring the intensity of ultrasonic waves generated by a diaphragm including a plurality of vibrators in a cleaning tank is provided. The apparatus includes a frame having bars corresponding to each side of a hexahedron, and a plurality of aluminum foils spaced a predetermined interval apart from each other and perpendicular to four parallel bars of the frame. The apparatus for measuring the intensity of ultrasonic waves can be used for cleaning a shadow mask during manufacture of a cathode ray tube.

7 Claims, 2 Drawing Sheets

FIG. 3A

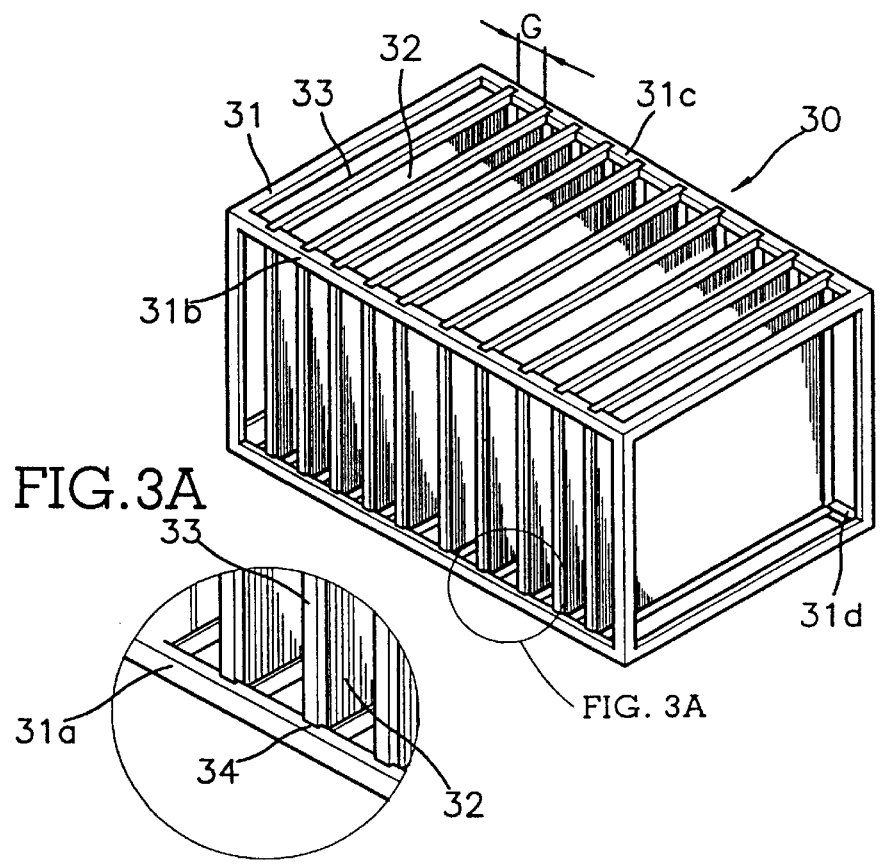
FIG. 3
FIG. 3A
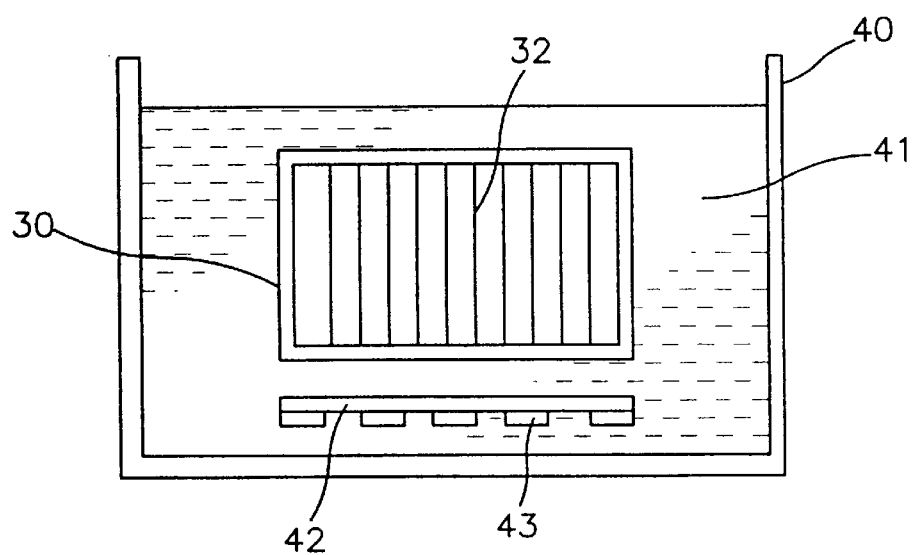
FIG. 4

APPARATUS FOR MEASURING INTENSITY OF ULTRASONIC WAVES IN A CLEANING TANK

BACKGROUND OF THE INVENTION

The present invention relates to an apparatus for measuring the intensity of ultrasonic waves in a cleaning tank, and more particularly to an apparatus for precisely measuring the intensity of ultrasonic waves according to the relative position within the cleaning tank.

A shadow mask is generally cleaned during the manufacture of a cathode ray tube by placement into a cleaning tank where the vibrations of ultrasonic waves clean the mask.

FIG. 1 shows the structure of a conventional ultrasonic wave cleaning tank in which a diaphragm 11 including a plurality of vibrators 12 is installed near the bottom of the cleaning tank 10 where the diaphragm 11 vibrates according to the vibrations of the vibrators 12 to generate ultrasonic waves.

FIG. 2 shows a phase of the ultrasonic wave generated by the vibration of diaphragm 11. That is, the ultrasonic waves generated from the diaphragm 11 of a sound source are reflected on a water surface 20 according to characteristics of the vibrators 12 (see FIG. 1), and takes the form of a standing wave including a peak 21 and a node 22. However, the intensity of the ultrasonic waves is maximum at the peak 21 and minimum at the node 22. Accordingly, an object to be cleaned (not shown) in the cleaning tank 10 of FIG. 1 is cleaned effectively at the peak 21 of the wave, but ineffectively at the node 22. The poor-cleaning regions have a detrimental influence on the reliability of cleaning the mask. Accordingly, it is important to precisely measure the positions of each peak 21 and each node 22. The position of the peak 21 and the node 22 can be known by measuring the intensity of the ultrasonic waves in the vertical direction with respect to the water surface.

Also, the characteristics of each vibrator 12 may differ. Accordingly, the intensity of each ultrasonic wave may be different on the same plane parallel to the water surface 20. However, it is not easy to precisely measure the intensity of each ultrasonic wave according to each position.

The conventional intensity of the ultrasonic waves in the cleaning tank has been calculated according to mathematical and physical theories. That is, the distance between the diaphragm of the sound source and the water surface has been measured and the intensity of the ultrasonic waves has been calculated according to a standing wave theory based on the measured distance. However, the result of the calculation is theoretical so that the actual intensity of the ultrasonic waves is not precisely indicated.

One method for measuring the actual intensity of the ultrasonic waves is to place a piece of aluminum foil into the cleaning tank and then generate ultrasonic waves to observe the cleaning of the aluminum foil and thereby measure the intensity of the ultrasonic waves. That is, in a portion of the aluminum foil where the intensity of the ultrasonic waves is high, fine holes or wear in the foil can be observed, and in a portion of the aluminum foil where the intensity thereof is low, there is virtually no change.

However, with the above method, the position of the aluminum foil cannot be precisely set, so that the intensity of the ultrasonic waves cannot be precisely measured at each position. Also, the distribution of intensities with respect to each position in the cleaning tank cannot be understood by measurement thereof with a piece of aluminum foil.

SUMMARY OF THE INVENTION

To solve the above problem, it is an object of the present invention to provide an apparatus for measuring the intensity of ultrasonic waves including a plurality of aluminum foils to precisely measure the distribution of the intensity of ultrasonic waves according to each position in a cleaning tank.

To accomplish the above object of the present invention, there is provided an apparatus for measuring the intensity of ultrasonic waves generated by a diaphragm in a cleaning tank, comprising: a frame including bars corresponding to each side of a hexahedron; and a plurality of aluminum foils spaced a predetermined interval apart from each other and perpendicular to four parallel bars of the frame.

Preferably, the aluminum foils are detachably installed to the frame.

It is also preferable to further include an auxiliary frame for supporting the outer edges of the aluminum foil.

It is a further preferred feature that the aluminum foils be spaced at an interval of ⅙ the wavelength of ultrasonic waves generated by the diaphragm.

BRIEF DESCRIPTION OF THE DRAWINGS

FIG. 3 is a perspective view of an apparatus for measuring the intensity of ultrasonic waves according to the present invention; and FIG. 4 is a view showing the operation of an apparatus for measuring the intensity of the ultrasonic waves according to the present invention in use.

DETAILED DESCRIPTION OF THE INVENTION

Figure 1:
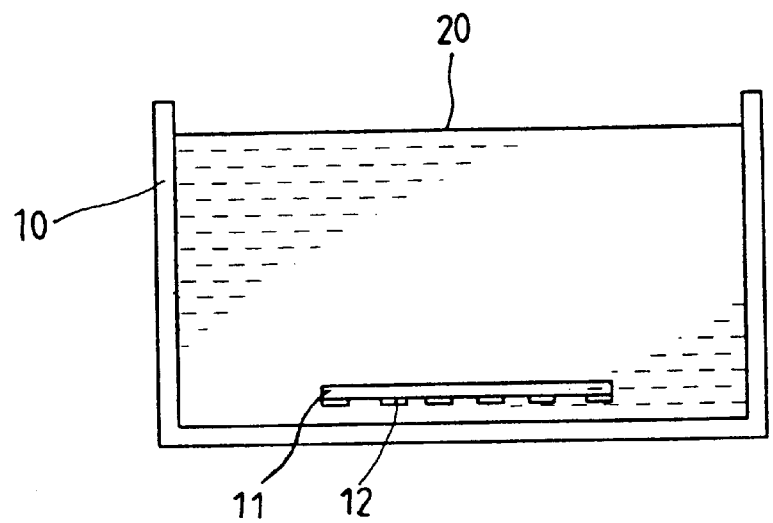
FIG. 1 is a side view of a conventional ultrasonic wave cleaning tank.
Figure 2:
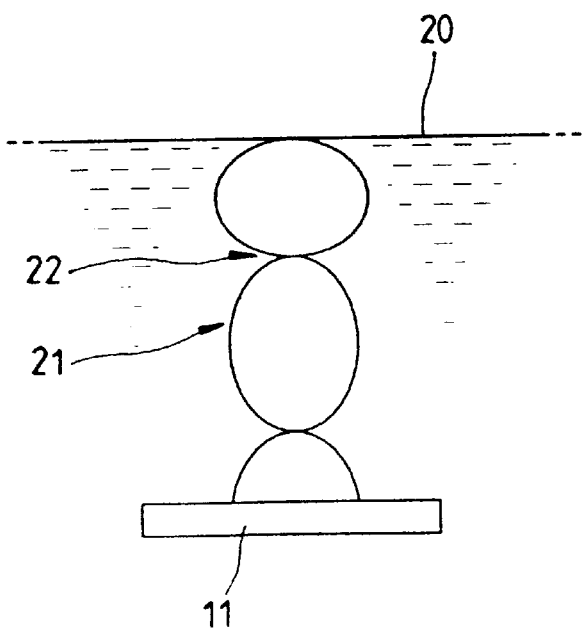
FIG. 2 a view showing a phase of an ultrasonic wave generated by a diaphragm.

Referring to FIG. 3, an apparatus for measuring the intensity of ultrasonic waves in a cleaning tank according to the present invention is provided with a frame 30 including twelve bars 31 corresponding to each side of a hexahedron. A plurality of aluminum foils 32 are installed in the frame 30 and are spaced a predetermined interval apart from each other perpendicular to bars 31a, 31b, 31c and 31d which are parallel with each other.

Each of aluminum foils 32 are fixed by an auxiliary frame 33 wrapping and supporting outer edges of the aluminum foils. The auxiliary frame 33 is detachably fitted to grooves 34 formed in the bars 31a, 31b, 31c and 31d at predetermined intervals to thereby install the aluminum foil 32 in the frame 30.

It is preferable that an interval 'G' between the aluminum foils 32 corresponds to a distance of ⅙ the wavelength λ of the ultrasonic waves, however, 'G' is not limited thereto.

The above-described apparatus for measuring the intensity of ultrasonic waves according to the present invention, as shown in FIG. 4, is put into a cleaning tank 40, to thereby measure the intensity of ultrasonic waves. A cleaning solution 41 fills the cleaning tank 40, and a diaphragm 42 having a plurality of vibrators 43 s installed near the bottom of the cleaning tank 40. Preferably, the apparatus for measuring the intensity of the ultrasonic waves is installed in the cleaning tank 40 such that the aluminum foils 32 are perpendicular to the diaphragm 42.

It is preferable that a horizontal sectional area of the frame 30 corresponds to an area of the diaphragm 42. Accordingly, the number of aluminum foils 32 can be determined according to the size of the diaphragm 42 and wavelength of the ultrasonic waves generated from the diaphragm 42.

In a state in which the apparatus for measuring the intensity of ultrasonic waves is installed into cleaning tank 40, the diaphragm 42 is vibrated by the vibrators 43, to thereby generate ultrasonic waves. The ultrasonic waves form the previously-described standing waves, and cleaning is performed well at the peaks 21 of FIG. 1 of the wave, however, cleaning is poorly performed at the node 22 of the wave. According to the distribution of the intensity of ultrasonic waves generated from the diaphragm 42, the aluminum foil 32 of the apparatus is cleaned. At this time, in a portion of the aluminum foil 32 corresponding to the peaks 21 of the wave, cleaning is intense, to thereby form fine holes, and in a portion of the aluminum foil 32 corresponding to the nodes 22 of the wave, cleaning is poor. The results of the above cleaning phenomenon is shown in all of the plurality of aluminum foils 32.

After a predetermined time, the apparatus for measuring the intensity of ultrasonic waves is taken out of the cleaning tank 40, and then each of the aluminum foils 32 is detached and the cleaning state of each foil is checked, to thereby determine the distribution of the intensity of ultrasonic waves. Portions of the aluminum foil 32 having many holes indicate intense cleaning, and portions where the initial state is maintained or small particles are collected, has poor cleaning. The small particles are removed from the intensely cleaned portions of the aluminum foil 32.

The distributions of the holes and particles on the aluminum foil 32 are continuous to thereby detect the continuous distribution of the intensity of ultrasonic waves. At this time, a piece of aluminum foil 32 is analyzed, to thereby obtain a vertical distribution of the intensity of ultrasonic waves, and analyses of each aluminum foil 32 are compounded, to thereby obtain a horizontal distribution of the intensity thereof.

As described above, according to the apparatus for measuring the intensity of ultrasonic waves of the present invention, the cleaning state of a plurality of aluminum foils perpendicular to the diaphragm is checked, to thereby measure the distribution of sequential intensity of the ultrasonic waves according to each position. Also, the aluminum foil is detachably fixed to the frame, so that it can be easily used and maintained, and the intensity of the ultrasonic waves can be measured at low cost.

What is claimed is:

1. An apparatus for measuring the intensity of ultrasonic waves generated by a diaphragm in a cleaning tank, comprising:

a frame including bars corresponding to each side of a hexahedron; and a plurality of aluminum foils spaced a predetermined interval apart from each other and perpendicular to four parallel bars of said frame.

2. An apparatus for measuring the intensity of ultrasonic waves according to claim 1, wherein said aluminum foils are detachably installed to said frame.

3. An apparatus for measuring the intensity of ultrasonic waves according to claim 1, further comprising an auxiliary frame for supporting outer edges of said aluminum foil.

4. An apparatus for measuring the intensity of ultrasonic waves according to claim 3, wherein grooves are formed at predetermined intervals on said four parallel bars, and said auxiliary frame is detachably fitted into said grooves.

5. An apparatus for measuring the intensity of ultrasonic waves according to claim 4, wherein each groove is formed at an interval of the $\frac{1}{6}$ the wavelength of ultrasonic waves generated by said diaphragm.

6. An apparatus for measuring the intensity of ultrasonic waves according to claim 1, wherein said aluminum foils are spaced at an interval of $\frac{1}{6}$ the wavelength of ultrasonic waves generated by said diaphragm.

7. An apparatus for measuring the intensity of ultrasonic waves according to claim 1, wherein a horizontal sectional area of said frame corresponds to an area of said diaphragm.

\* \* \* \* \*